March 17, 1931.  L. B. GREEN  1,796,753
MECHANICAL MOVEMENT
Filed July 12, 1928  2 Sheets-Sheet 1
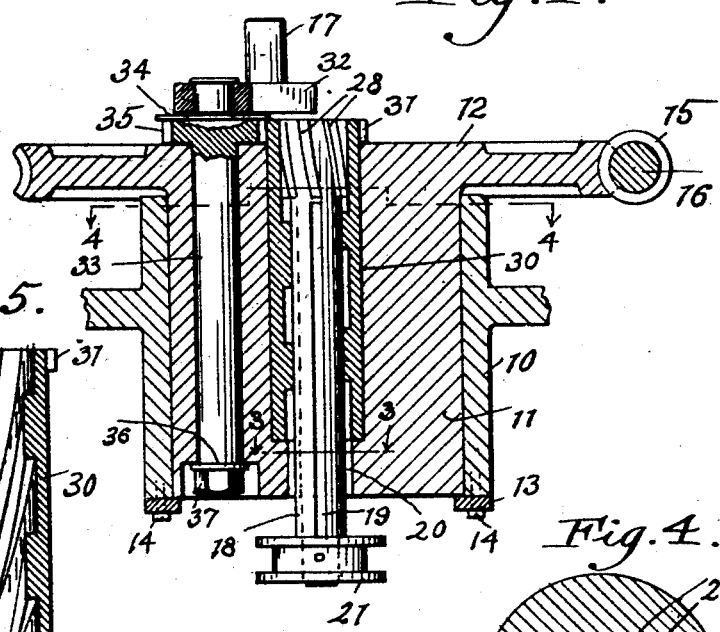
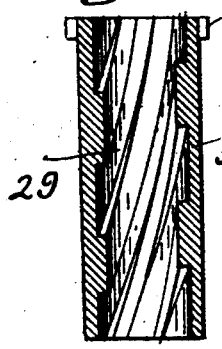
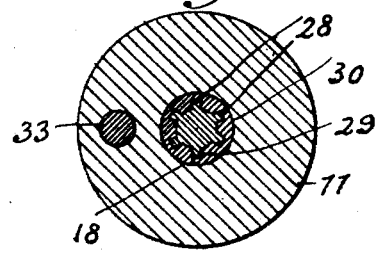
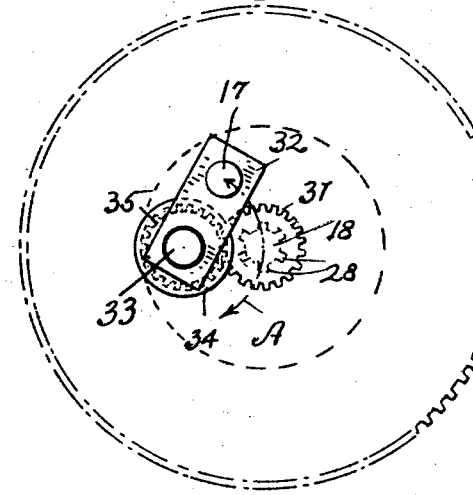
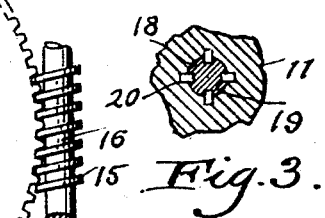
INVENTOR
Lee B. Green
BY
Kwis Hudson + Kent
ATTORNEYS March 17, 1931.  L. B. GREEN  1,796,753
MECHANICAL MOVEMENT
Filed July 12, 1928  2 Sheets-Sheet 2
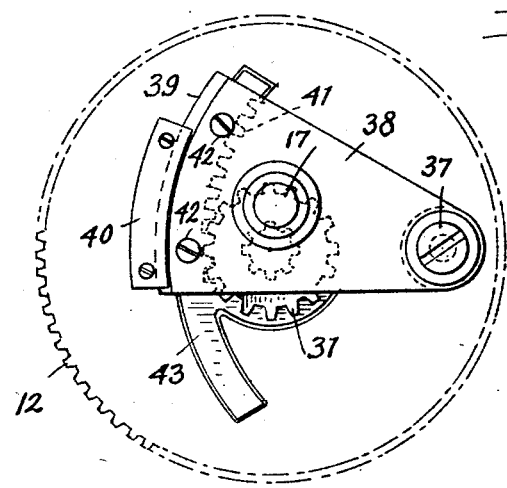
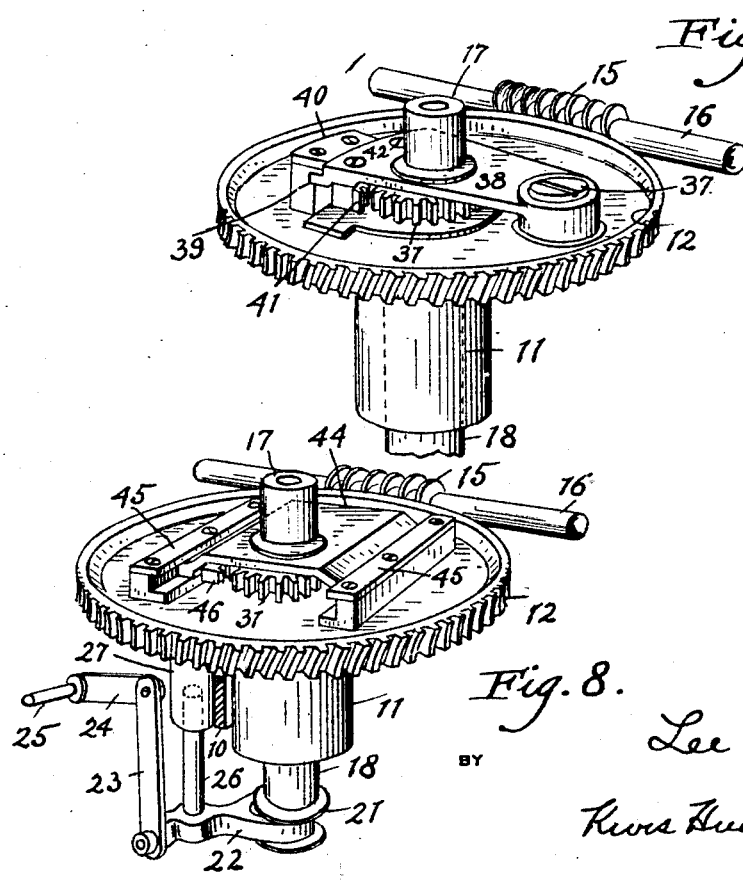
INVENTOR
Lee B. Green
BY
Rivers Hudson & Kent
ATTORNEYS Patented Mar. 17, 1931

1,796,753

UNITED STATES PATENT OFFICE

LEE B. GREEN, OF LAKEWOOD, OHIO, ASSIGNOR TO THE BORDEN COMPANY, OF WARREN, OHIO, A CORPORATION OF OHIO

MECHANICAL MOVEMENT

Application filed July 12, 1928. Serial No. 292,149.

This invention relates to improvements in mechanical movements, and has reference particularly to a mechanism in which the eccentricity of a crank pin, that is its position relative to the axis of revolution, may be varied without interrupting the operation of the mechanism. The invention involves also means for stopping and starting the revolution of the crank pin by moving the same to or away from its axis of revolution. The mechanical movement of the invention may thus be employed for driving machines of various kinds, to start and stop the same, and to vary the degree of movement through a considerable range without stopping the machine.

One of the objects of the invention is the provision of a mechanism which can be thus employed to start and stop the machine with which it is used and to vary the degree of movement of the machine without stopping the same.

Another object is the provision of means for accomplishing the above result, which means shall be irreversible, that is to say, means which will hold its various adjustments despite the load which may be put upon it.

Other objects and features of novelty will appear as I proceed with the description of those embodiments of the invention which, for the purpose of the present application, I have illustrated in the accompanying drawings, in which—

Fig. 1 is a vertical sectional view of one form of the invention;

Fig. 2 is a plan view thereof;

Fig. 3 is a cross sectional detail view taken substantially on the line 3—3 of Fig. 1;

Fig. 4 is a further cross sectional detail view taken substantially on the line 4—4 of Fig. 1;

Fig. 5 is a detail view in central longitudinal section of one of the elements of the mechanism;

Fig. 6 is a perspective view of a second form of the invention;

Fig. 7 is a plan view of the mechanism illustrated in Fig. 6; and

Fig. 8 is a perspective view of a third form of the invention.

In the drawings I have illustrated at 10 a journal or bearing for a hub 11 of a worm wheel 12, a retaining ring 13 of a width sufficient to extend somewhat over the end of the surface of the hub being attached to the bearing 10 by screws 14 or the like. The worm wheel 12 meshes with a worm 15 formed upon a shaft 16, through which power is furnished to the mechanism.

The worm wheel 12 carries a crank pin 17 which revolves about the center of the wheel and is adapted to transmit power to any suitable connecting rod or other similar part of the machine to be driven by the present mechanism. No such machine is illustrated herein, as the invention is of more or less general application. It should be remarked that the crank pin 17 may at times take the form of an eccentric. In its broader aspect the invention consists in the provision of means for moving the center of the crank pin 17, or its equivalent, toward and away from the center of the wheel 12.

The means which I employ for shifting the crank pin 17 comprises a rod 18 which is slidably mounted in an axial position in the hub 11, being provided with longitudinal keyways 19 which slidably engage keys 20 set into the hub 11. The rod 18 and hub 11 therefore rotate together, but are relatively movable in an axial direction.

On one end the rod 18 has pinned thereto a flanged collar 21 by means of which it may be moved longitudinally, as through a fork 22 (Fig. 8). This fork may have attached thereto a link 23 operated by a crank 24 on an oscillatory shaft 25 under control of the operator. In order to guide and steady the movement of the fork 22 it may be provided with a post 26 slidable in a guide 27 attached to the bearing 10 or other fixed support.

On the opposite end of the rod 18 there are a series of spiral teeth 28 which mesh with spiral grooves 29 formed internally in a sleeve 30 which surrounds the rod 18 and constitutes part of the slide bearing for the same. The sleeve 30 is mounted in a smooth bore in the hub 11 concentric with the axis thereof, and it is capable of a slight rotation with respect to the hub, this rotation being brought about by the action of the spiral teeth 28 in the grooves 29 as the rod 18 is moved lengthwise. Outside the worm wheel 12 the sleeve 30 is provided with external gear teeth to form a pinion 31. The rotation of the sleeve 30 therefore turns the pinion 31 with respect to the wheel 12, these parts being all concentric.

The shifting of the crank pin 17 by means of the rotation of the pinion 31 with respect to the wheel 12 may be accomplished in various ways. Three such ways are illustrated herein by way of example and will now be described.

In the construction of Figs. 1 to 5, inclusive, the crank pin 17 is mounted upon the free end of an arm 32 which is carried upon a shaft 33 that is rotatably mounted in the hub 11. Under the arm 32 there is an annular flange or collar 34 which engages the end surface of pinion 31 and thereby holds the sleeve 30 against longitudinal movement. Under the collar 34 there is a pinion 35 which meshes with pinion 31. The shaft 33 may be held against longitudinal movement by a washer 36 and a nut 37, the latter being threaded onto a reduced end of the shaft 33. Obviously, as the pinion 31 turns, it transmits rotation to the pinion 35 and the shaft 33, thereby swinging the arm 32 and causing the crank pin 17 to move through an arc of a circle struck from the center of the shaft 33. Preferably, the distance between the axes of the shaft 33 and pin 17 is the same as the distance between the axes of the two pinions 33 and 31, so that in one position of the arm 32 the pin 17 stands concentric with the worm wheel 12 and has motion of rotation without motion of revolution. For some purposes the parts may be so designed that the movement of the crank pin 17 may be continued past the center and outwardly on the other side, in other words its total movement may be substantially as indicated by the arc A in Fig. 2.

Referring now to Figs. 6 and 7, the worm wheel 12 is provided with a pivot pin 37 secured to the wheel, upon which pin is mounted for swinging movement a sector 38 rigidly supporting the pin 17 and movable over the end surface of the pinion 31. On its free end the sector 38 has an arcuate flange 39 which runs in a retaining arcuate block 40 that is fixed to the wheel 12. An arcuate rack 41 is attached to the underside of the sector 38 by means of screws 42 or the like, this rack meshing with pinion 31. If desired the wheel 12 may be provided with a raised machined bearing surface 43 over which the rack 41 slides. In this case also the center distance between the pin 17 and the pivot 37 is preferably the same as that between the pinion 31 and the pivot 37, so that as the pinion 31 turns the rack 41 is moved upon the surface of the wheel, swinging the sector 38 upon its pivot and carrying the crank pin 17 toward and away from the center of the wheel 12.

The construction of Fig. 8 is similar to that of Figs. 6 and 7, but in this case the crank pin 17 is mounted upon a slide plate 44 which moves in guides 45 attached to the side of the wheel 12. The plate 44 carries on its underside a straight rack 46 which meshes with pinion 31. The pin 17 is so located upon the plate 44 that its line of movement crosses the axis of pinion 31, that is to say, such an arrangement is preferred inasmuch as it permits the complete interruption of the pin's motion of revolution.

The operation of the mechanism above disclosed will be obvious from the description given. It enables the operator, by shifting the rod 18 lengthwise in the hub 11, either while the wheel 12 is at rest or while it is moving, to impart a turning movement to the sleeve 30 because of its spiral tooth connection with the rod 18. This turning movement of the sleeve 30 acts through pinion 31 to shift the crank pin 17 toward or away from the center of the wheel 12, thereby varying the throw of the crank. An infinite number of adjustments may be obtained between zero and the maximum, and the change is made without jar or noise or any possible damage to the mechanism. Furthermore, the spiral tooth or screw connection between the rod 18 and sleeve 30 may be made steep enough so that any load which may be imposed by the driven mechanism will be insufficient to produce a reverse screw action, which would change the adjustment. In other words, the adjusting mechanism is irreversible.

While various machines may be advantageously driven through the mechanism illustrated, it may be remarked by way of example that the employment of my invention in washing machines of the oscillator or agitator type has been found to give excellent results, inasmuch as it provides not only starting and stopping of the washing apparatus while the motor runs continuously and without the use of clutches of any kind, but also inasmuch as it enables the operator to regulate the stroke of the agitator, thus suiting it to the character of the fabrics in the machine.

The invention also finds utility in its application to a reversing mechanism for locomotives, where the crank pin is caused to move across the center of its wheel to reverse the operation of the slide valve.

In the foregoing description I have necessarily gone somewhat into detail in order to explain fully the particular embodiments of the invention herein illustrated, but I desire it to be understood that such details are not to be construed as limitations except as they may be included in the appended claims.

Having thus described my invention, I claim:

1. In a mechanical movement, a horizontal rotating wheel having a depending hub, a bearing for said hub, a drive member mounted upon the upper side of said wheel, means for varying the distance between the center of said wheel and the center of said drive member, comprising a vertical slide keyed in the hub of the wheel, a hollow pinion rotatably mounted upon the wheel concentric with said slide, and a spiral thread connection between said pinion and slide for imparting rotation of the wheel to said pinion and for imparting independent rotation thereto when the slide is moved longitudinally, and means located below said wheel for imparting vertical motion to said slide.

2. In combination, a horizontal rotating wheel having a depending hub, a bearing for said hub, a pinion mounted centrally in said wheel and extending upwardly therefrom, a second pinion mounted eccentrically upon said wheel meshing with said first named pinion, a drive member eccentrically mounted upon said second pinion, a mechanical connection for imparting the rotation of said wheel to said first pinion and for imparting independent rotation thereto during the rotation of said wheel, comprising a vertical slide keyed in the hub of the wheel and having a spiral thread connection with said central pinion, and means located below said wheel for imparting vertical motion to said slide.

3. In combination, a horizontal rotating wheel, a pinion mounted centrally in said wheel, a second pinion mounted eccentrically upon said wheel meshing with said first named pinion, a drive member eccentrically mounted upon said second pinion at a distance equal to the spacing of the pinion axes, means for rotating said central pinion relatively to said wheel comprising a slide keyed in the hub of the wheel, a spiral thread connection between said slide and said central pinion, and means located below said wheel for imparting vertical motion to said slide.

4. In a mechanical movement, a horizontal rotating wheel having a depending hub, a bearing for said hub, a drive member mounted upon the upper side of said wheel, a hollow cylindrical member rotatably mounted in a bearing formed concentrically in said wheel, the upper portion of said cylindrical member protruding above said bearing and there provided with external teeth, a vertical slide keyed in the hub of said wheel having a spiral thread connection with the inner wall of said cylindrical member, and means carried by said wheel cooperating with the external teeth upon said cylindrical member for shifting said drive member toward and away from the center of the wheel when said slide is moved up or down.

In testimony whereof, I hereunto affix my signature.

LEE B. GREEN.